Nov. 26, 1968  S. L. MARTSOLF  3,413,648
X-Y PLOTTER COMBINED WITH CALCULATOR
Filed April 12, 1967  2 Sheets-Sheet 1

INVENTOR
SAMUEL L. MARTSOLF

BY

ATTORNEYS.

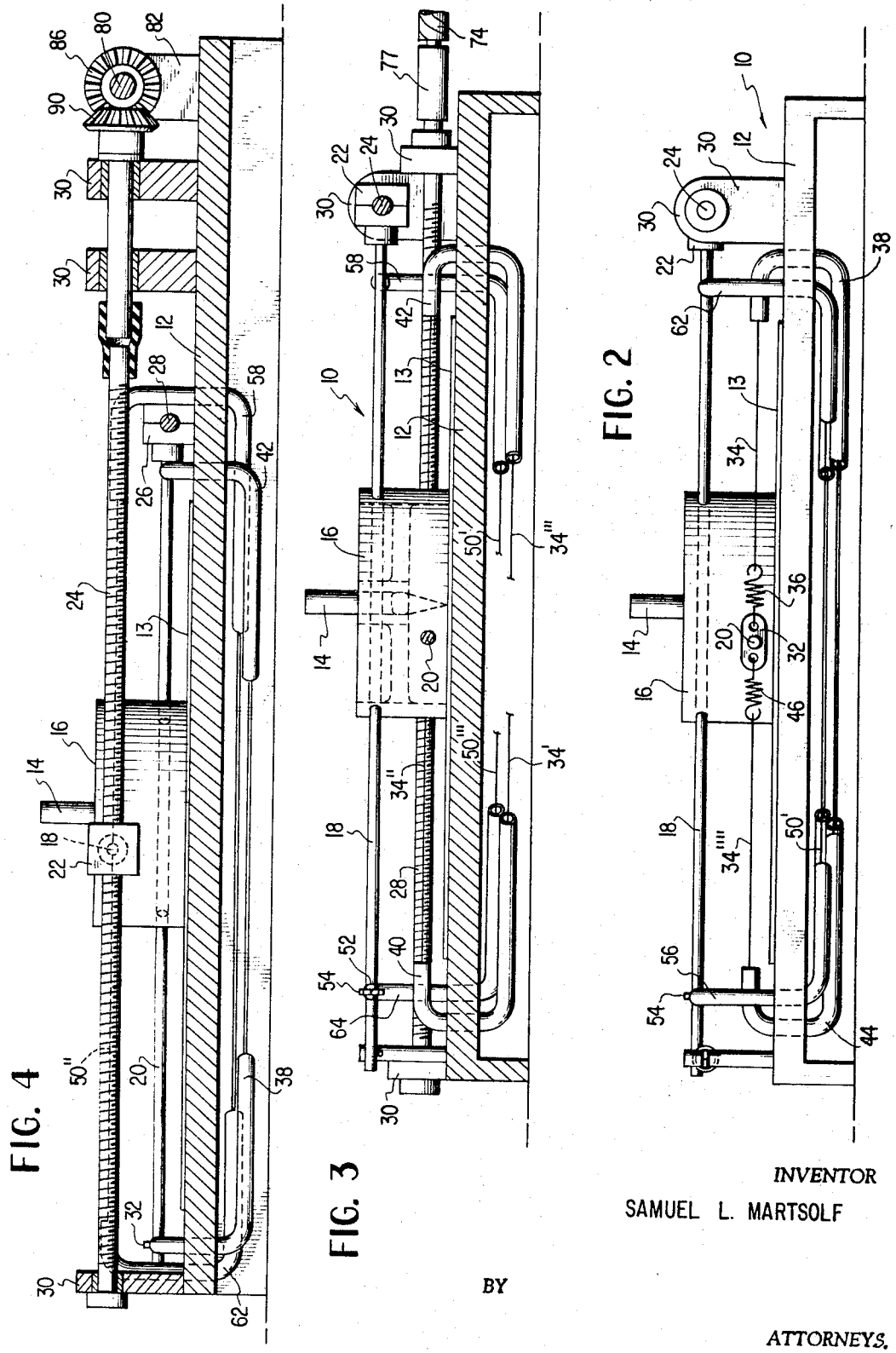

United States Patent Office 3,413,648
Patented Nov. 26, 1968

3,413,648
X-Y PLOTTER COMBINED WITH CALCULATOR
Samuel L. Martsolf, Rte. 2, Box 119-E,
Ocala, Fla. 32670
Filed Apr. 12, 1967, Ser. No. 630,431
5 Claims. (Cl. 346—29)

ABSTRACT OF THE DISCLOSURE

This invention comprises an automatic plotting machine which enables one to produce graphically the results of surveying or similar operations by computation of such results on a calculator. The machine includes a drafting board and stylus with mechanical drive means for moving the stylus along X and Y coordinates. The drive means is adapted to be connected to a calculator without modification of the calculator.

Background

There have been devised many automatic plotting machines for producing many varied types of graphs and layouts. Typical of the prior art in this field are: 2,569,328, Omberg, and 2,718,061, Omberg et al.

None of the prior art devices, however, fulfill the needs that the instant invention does. This invention provides an inexpensive machine to assist the draftsman in plotting the results of a survey and similar operations. The calculator with which the device is used is of the rotary type such as in a Friden Model "S." The construction of the plotting board is simple and inexpensive. This invention, therefore, fills the gap between the manual plotting means and the expensive, intricate machines of the prior art.

Objects

It is, therefore, an object of this invention to provide an inexpensive automatic plotting apparatus.

It is another object of this invention to provide an automatic plotting apparatus adapted to be connected to and to be driven by conventional calculating machines.

Summary

This invention provides an automatic plotting apparatus of simple and economical construction needing no source of power other than the calculator with which it is to be used.

FIG. 2 is a partial sectional view taken on line 2—2.

FIG. 3 is a partial sectional view taken on line 3—3; and

FIG. 4 is a partial sectional view taken on line 4—4.

Figure 1:
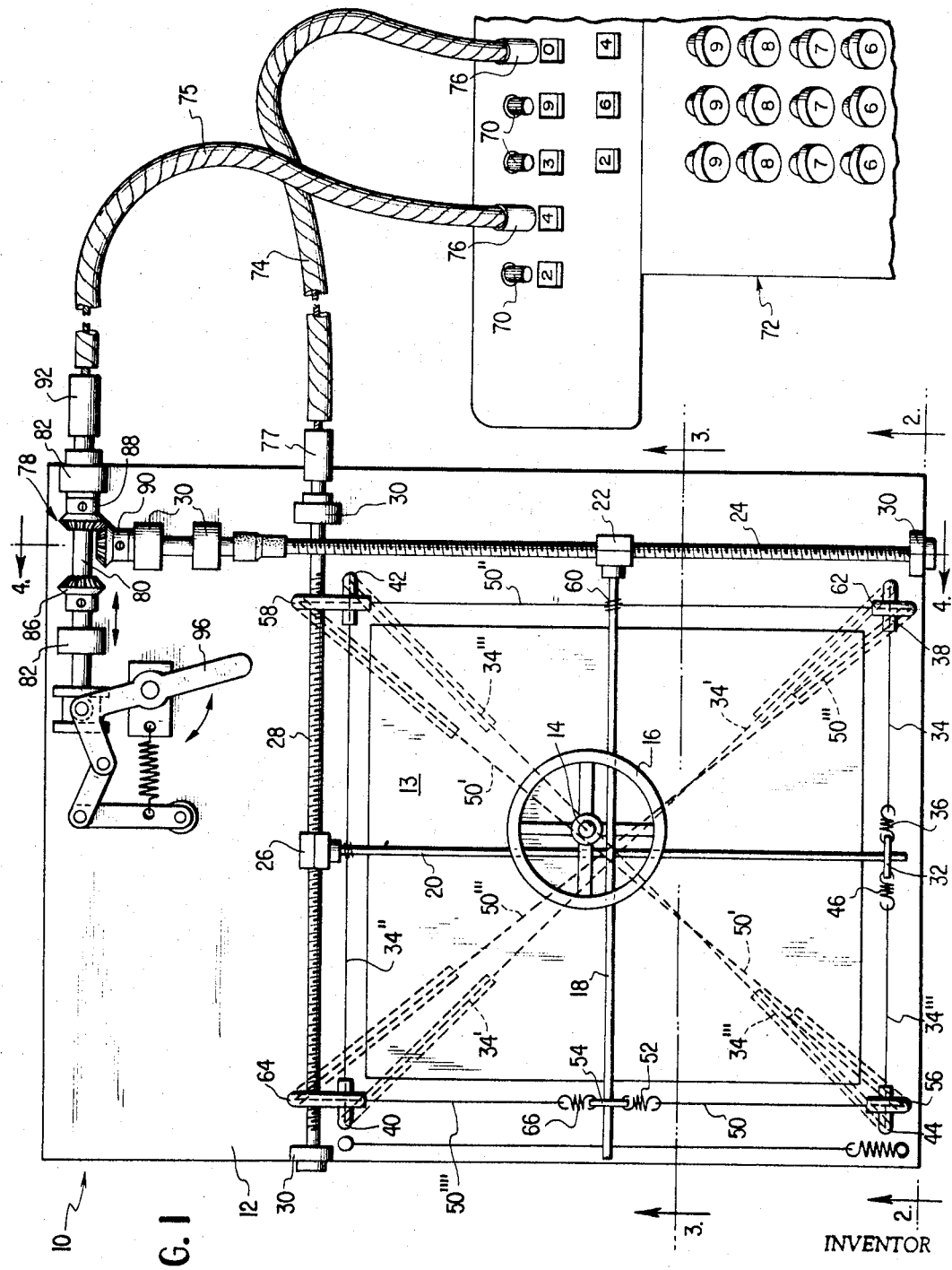
FIG. 1 is a plan view of the plotting device according to this invention, a calculator being shown in fragment.

The plotting or drafting device 10 comprises a rectangular support 12 having a smooth planar surface which is adapted to support a sheet of paper 13. The support may be provided with suitable indicia along the X and Y axes if so desired. A stylus 14 is supported in a hub 16 mounted for movement in a plane parallel to the support 12.

The hub 16 is slidably mounted on a pair of rods 18 and 20. The rod 18 is secured at its one end to a nut 22 which is threadably engaged with drive shaft 24. The rod 20 is similarly supported at its one end by a nut 26 on a further drive shaft 28.

The drive shafts 24 and 28 are rotatably supported at each end by suitable bearings 30. The drive shafts 24 and 28 are positioned in a plane parallel to the support and perpendicular to each other. Upon rotation of shaft 24, the nut 22 will move axially along the shaft 24 and move the rod 18 and hub 16 in the direction of the Y axis. Rotation of the drive shaft 28 will move the nut 26 together with the rod 20 and the hub 16 in the direction on the X axis.

It will thus be apparent hub 16 carrying the stylus 14 will be moved over a plotting sheet 13 along the X and Y axes upon actuation of the drive shafts.

Means are provided to support properly the free ends of the rods 18 and 20. The free end of rod 20 is secured to a plate 32. A wire 34, which is connected by a spring 36 to the plate 32, extends therefrom through curved guide tube 38. Guide tube 38 extends through the support 12 below the bottom surface thereof and curves through an angle of approximately 45° to change the direction of the wire 34. A portion of the wire 34' extends diagonally across the plotting area beneath the support 12 to another curved guide tube 40 of the same configuration as tube 38 which guides the wire 34 back to the upper surface. From this point, a portion of the wire 34" extends to and connects with the other end of the rod 20 at 44 in a suitable manner. From the rod 20, a portion 34" of the wire extends to a further guide tube 42 which directs the wire beneath the support 12 and directs a portion of the wire 34''' diagonally across and beneath the support 12 to guide tube 44. Guide tube 44 directs the wire 34 back to the upper surface of the support 12 where a portion 34'''' extends to a spring 46 secured to the plate 32.

A second wire 50 is secured to a spring 52 which is connected to a plate 54 mounted on the free end of the rod 18 and extends in the same manner as the wire 34. The wire 50 is directed beneath the support 12 by a guide tube 56. A portion of the wire 50' extends diagonally beneath the support 12 to guide tube 58 which directs the wire back to the upper surface of the support 12. A portion of the wire 50" extends to the other end of rod 18 and is secured thereto in a suitable manner. The portion of the wire 50" extends from the rod 18 to guide tube 62 which directs the wire beneath the surface of the support and directs a portion 50''' diagonally thereacross to guide tube 64 and back to the surface of the support. From guide tube 64, a portion 50'''' extends to a spring 66 connected to the plate 54.

In this manner both ends of the rods 18 and 20 are resiliently interconnected by the wires 34 and 50 to assure accurate movement of the rods over the plotting sheet 13.

Drive means is provided to actuate the drive shafts 24 and 28. The drive means is adapted to be secured to a rotary type calculator and actuated thereby. No additional source of power is needed. The drive means is motivated by the power of the calculator.

Calculators of this type have a plurality of rotatable accumulator pins commonly referred to as twirlers and are accessible from the exterior of the machine without removing any portion thereof such as shown in Friden et al. 2,391,089, wherein the pins extend from the dials 14 through the housing of the calculator. These members are designated by the numeral 70 on the fragmentary showing of a calculator 72.

Flexible lines 74 and 75 of conventional structure are provided on their one ends with hollow cups 76. The cups 76 may be formed of rubber, plastic or the like and are adapted to receive the twirlers 70. The cups 76 grip the twirlers snugly so that rotation of the twirlers 70 will rotate the cups 76 and lines 74 and 75.

The line 74 is connected at its other end to one end of the drive shaft 28 at 78 in a conventional manner. Thus it will be understood that rotation of the twirler 70 caused by entering a reading on the calculator 72 will rotate the shaft 28 a number of times in accordance with the reading placed on the calculator. The drive shaft 28 will, therefore, move the stylus 14 a certain distance along the X coordinate in response to the reading placed on the calculator.

The line 75 is connected with the drive shaft 24 through a reversible gear drive 78. In the illustrated embodiment of the gear drive 78, a shaft 80 is positioned perpendicular to the drive shaft 24 and is rotatably supported by bearings 82. A pair of bevel gears 86 and 88 are mounted on the shaft 80 in spaced relation and are adapted to engage alternately bevel gear 90 secured to the end of the drive shaft 24.

One end of the shaft 80 extends through the bearing 82 and connects with the end of line 75 at 92 by conventional means. The other end of the shaft 80 extends through the bearing 82 and connects with a lever 96 pivotally mounted on the support 12.

Pivotal movement of the lever 96 will reciprocate the shaft 80 so that either gear 86 or 88 will engage the gear 90 as desired.

It will thus be understood that actuation of the calculator will rotate the drive shaft 24 in one direction or the other depending on the gear arrangement to move the stylus along the Y coordinate in either a plus or minus direction.

An example of a plotting operation is set forth below using the following survey:

| Bearing | Distance | Cosine | Sine |
|---|---|---|---|
| N. 24-44-13 E | 639.08 | .908 2385 | .418 4528 |
| N. 64-01-34 E | 797.78 | .437 9615 | .898 9937 |
| S. 55-28-05 E | 763.44 | .566 8656 | .823 8102 |
| S. 46-03-01 W | 997.91 | .694 0269 | .719 9491 |
| N. 77-39-53 W | 916.17 | .213 6319 | .976 9142 |

Enter 90800418 in the keyboard, hold plus key down until lower dials read 64. At this time the first course will be plotted. Next, 43800899 keyboard plus key till lower dials read 80. Then 56700823 keyboard (reverse N–S machine) plus 76. Next, 69400720 (pos N–S machine) minus 100. Next, 21400977 keyboard (neg N–S machine) minus 92 and then 999000 keyboard minus 50 (pos N–S machine) completes the drawing. With two machine development the carriage could be moved and distances carried to hundredths, and coordinates carried; however, for most applications this is not necessary and the eight keyboard machine could be utilized to many applications.

The calculator provides the ratio by use of natural functions, sin and cosine to solve for latitudes and departures which are fed simulantaneously to the respective drives from tenths feed out—resulting in plotting the line to proper bearing and scale distance.

I claim:
1. Plotting apparatus comprising a support, a stylus, drive means for movably supporting said stylus on said support, said drive means comprising a rotatable rod extending parallel to the X axis of said support adjacent one side thereof and a further rotatable rod extending parallel to the Y axis of said support adjacent a side thereof, flexible means for actuating said drive means to move said stylus along the X and Y axes of said support, said flexible means comprises a first flexible line having an end secured to one of said rotatable rods and a second flexible line having an end secured to the other of said rotatable rods, and a cup secured to each free end of said flexible lines frictionally receiving the accumulator pins of a calculator to be rotated thereby upon actuation of the calculator thus imparting rotational movement to said flexible lines and said rods.

2. Plotting apparatus as set forth in claim 1, wherein said drive means includes a pair of arms, an arm being mounted on each of said rods for movement along the longitudinal axis thereof, and said arms being connected to said stylus.

3. Plotting apparatus as set forth in claim 2 including means on said support for supporting the free ends of said arms.

4. Plotting apparatus as set forth in claim 2 wherein said rotatable rods are threaded and said arms are threadably engaged therewith so that upon rotation of said rods the arms will be moved along the longitudinal axes thereof.

5. Plotting apparatus as set forth in claim 1 wherein said flexible members comprise rubber tubing.

References Cited

UNITED STATES PATENTS

| | | | |
|---|---|---|---|
| 1,985,265 | 12/1934 | Smith | 346—8 X |
| 2,391,089 | 12/1945 | Friden et al. | 235—145 |
| 2,651,400 | 9/1953 | Young et al. | 197—2 |
| 2,907,623 | 10/1959 | Parenti | 346—139 |
| 3,293,651 | 12/1966 | Gerber et al. | 346—29 |

RICHARDSON B. WILKINSON, *Primary Examiner*

JOSEPH W. HARTLEY, *Assistant Examiner.*